United States Patent
Wexler et al.

(10) Patent No.: US 11,132,417 B2
(45) Date of Patent: Sep. 28, 2021

(54) WEB CONTENT PUBLISHING ACQUISITION

(71) Applicant: Oath Inc., New York, NY (US)

(72) Inventors: Michael Carey Wexler, Mountain View, CA (US); Donald Evans McLean, Denver, CO (US)

(73) Assignee: VERIZON MEDIA INC., New York, NY (US)

( * ) Notice: Subject to any disclaimer, the term of this patent is extended or adjusted under 35 U.S.C. 154(b) by 631 days.

(21) Appl. No.: 14/588,309

(22) Filed: Dec. 31, 2014

(65) Prior Publication Data
US 2016/0188741 A1    Jun. 30, 2016

(51) Int. Cl.
*G06Q 30/00* (2012.01)
*G06F 16/955* (2019.01)
*H04L 29/08* (2006.01)

(52) U.S. Cl.
CPC ............ *G06F 16/955* (2019.01); *H04L 67/02* (2013.01); *H04L 67/22* (2013.01)

(58) Field of Classification Search
CPC ................................................ G06F 17/30876
USPC .......................................................... 705/14.6
See application file for complete search history.

(56) References Cited

U.S. PATENT DOCUMENTS

| | | | |
|---|---|---|---|
| 7,895,208 B2 * | 2/2011 | Konopnicki | G06F 16/9535 707/738 |
| 8,543,637 B2 * | 9/2013 | Kent, Jr. | H04L 51/04 709/203 |
| 8,838,572 B2 * | 9/2014 | Lin | G06F 16/9024 707/709 |
| 2006/0168520 A1 * | 7/2006 | Lapstun | G07D 7/128 715/274 |
| 2008/0082400 A1 * | 4/2008 | Martel | G06Q 30/02 705/14.42 |
| 2010/0023395 A1 * | 1/2010 | Bugenhagen | G06Q 30/0261 705/14.45 |
| 2010/0084155 A1 | 4/2010 | Jafari | |
| 2010/0121849 A1 * | 5/2010 | Goeldi | G06Q 50/01 707/736 |
| 2012/0036200 A1 * | 2/2012 | Cole | H04L 51/32 709/206 |
| 2012/0210247 A1 * | 8/2012 | Khouri | G06F 3/0482 715/751 |
| 2012/0254760 A1 * | 10/2012 | Meeker | G06F 16/958 715/733 |
| 2012/0296920 A1 * | 11/2012 | Sahni | H04L 67/02 707/749 |

(Continued)

FOREIGN PATENT DOCUMENTS

| | | | | |
|---|---|---|---|---|
| WO | WO-2007133969 A3 * | 10/2008 | | H04L 12/66 |
| WO | WO-2009157845 A1 * | 12/2009 | | H04L 63/10 |
| WO | WO-2014004583 A1 * | 1/2014 | | H04N 21/4223 |

OTHER PUBLICATIONS

Wolfe, Hannah. Make Your Theme Multi-User Ready. (Aug. 6, 2014). Retrieved online Oct. 26, 2020. https://ghost.org/changelog/themes-multi-user-ready/(Year: 2014).*

(Continued)

*Primary Examiner* — James A Reagan
(74) *Attorney, Agent, or Firm* — Cooper Legal Group LLC

(57) ABSTRACT

Briefly, embodiments disclosed herein relate to acquisition of web content publishing.

32 Claims, 12 Drawing Sheets

(56) References Cited

U.S. PATENT DOCUMENTS

| | | | | |
|---|---|---|---|---|
| 2012/0324008 | A1* | 12/2012 | Werz, III | G06Q 30/02 |
| | | | | 709/204 |
| 2013/0124497 | A1* | 5/2013 | Lin | G06F 16/285 |
| | | | | 707/709 |
| 2013/0204664 | A1* | 8/2013 | Romagnolo | G06Q 30/0203 |
| | | | | 705/7.32 |
| 2013/0218865 | A1* | 8/2013 | Angulo | G06F 16/248 |
| | | | | 707/709 |
| 2014/0324533 | A1* | 10/2014 | Magnaghi | G06F 16/2365 |
| | | | | 705/7.31 |
| 2014/0379462 | A1* | 12/2014 | Rangarajan | G06Q 30/0254 |
| | | | | 705/14.46 |
| 2015/0081397 | A1* | 3/2015 | Hummel | G06Q 10/06375 |
| | | | | 705/7.37 |
| 2016/0197993 | A1* | 7/2016 | Perkowski | H04L 67/02 |
| | | | | 709/203 |

OTHER PUBLICATIONS

Cooper Pickett. A Beginner's Guide to Ghost. (Oct. 31, 2013). Retrieved online May 17, 2021. https://www.searchenginewatch.com/2013/10/31/a-beginners-guide-to-ghost/ (Year: 2013).*

Julie Giles. How to Build an Audience for Your Web Series: Market, Motivate and Mobilize Publication. (May 2011). Retrieved online May 17, 2021. https://ipf.ca/wp-content/uploads/IPF-How-To-Build-an-Audience-for-Your-Web-Series-1.pdf (Year: 2011).*

Hsieh, Jonathan et al, "The Architecture and Implementation of an Extensible Web Crawler", Department of Computer Science and Engineering, University of Washington, Seattle, WA, USA, 2010.

* cited by examiner

WEB CONTENT PUBLISHING ACQUISITION

BACKGROUND

Field

Subject matter disclosed herein may relate to acquisition of web content publishing.

Information

With networks, such as the Internet, gaining popularity, and with a vast multitude of content, such as pages, other electronic documents, other media content and/or applications (hereinafter 'digital content'), becoming available to users, such as via the World Wide Web (hereinafter 'Web'), it may be desirable to provide more efficient and/or more streamlined approaches to gather, organize and/or display content, such as digital content, that may be desired by and/or useful to a user, for example. Internet-type business entities, such as Yahoo!, for example, may provide a wide range of content, such as digital content, that may be made available to users, such as via the Web. Internet-type business entities, such as Yahoo!, for example, may provide web content publishing services, for example.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
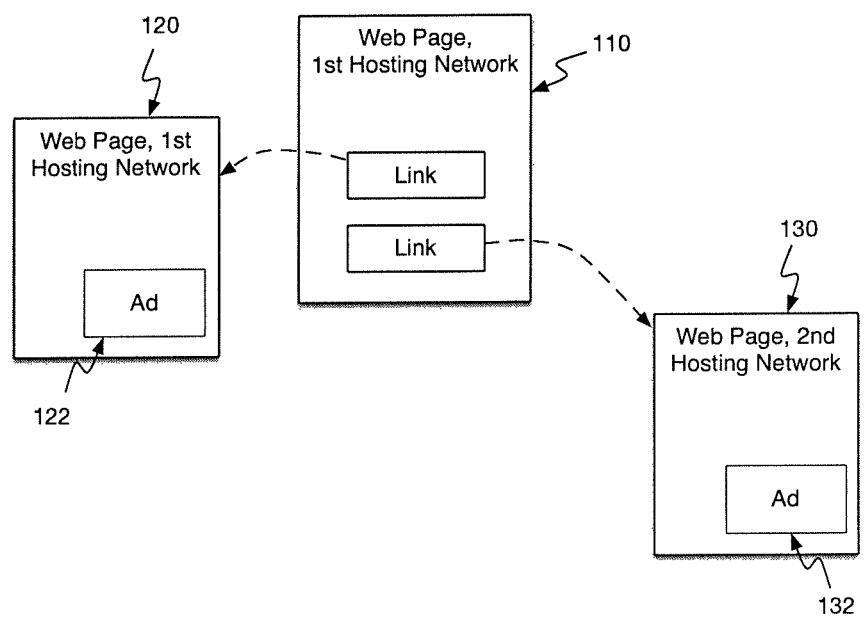
FIG. 1 is a schematic diagram illustrating an example web page in accordance with an embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which portions of a problem, such as signal processing of signal samples, for example, may be allocated among computing devices, including one or more clients and/or one or more servers, via a computing and/or communications network, for example. A network may comprise two or more network devices and/or may couple network devices so that signal communications, such as in the form of signal packets and/or frames (e.g., comprising one or more signal samples), for example, may be exchanged, such as between a server and a client device and/or other types of devices, including between wireless devices coupled via a wireless network, for example.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals (e.g., signal samples), such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. As mentioned, signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be compliant and/or compatible with differing protocols, such as computing and/or communication protocols (e.g., network protocols), may interoperate within a larger network. In this context, the term sub-network and/or similar terms, if used, for example, with respect to a network, refers to the network and/or a part thereof. Sub-networks may also comprise links, such as physical links, connecting and/or coupling nodes so as to be capable to transmit signal packets and/or frames between devices of particular nodes including wired links, wireless links, or combinations thereof. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without a need for re-routing and/or redirecting transmissions. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate nodes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but such devices outside the private network may not necessarily be able to direct inbound network communications to devices included in the private network.

The Internet refers to a decentralized global network of interoperable networks that comply with the Internet Protocol (IP). It is noted that there are several versions of the Internet Protocol. Here, the term Internet Protocol, IP, and/or similar terms, is intended to refer to any version, now known and/or later developed of the Internet Protocol. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately compatible and/or compliant signal packets and/or frames. It is noted that there are several versions of the Hypertext Transfer Protocol. Here, the term Hypertext Transfer Protocol, HTTP, and/or similar terms is intended to refer to any version, now known and/or later developed. It is likewise noted that in various places in this document substitution of the term Internet with the term World Wide Web ('Web') may be made without a significant departure in meaning and may, therefore, not be inappropriate in that the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility that may be accessible to tens of millions of people or more worldwide. Also, in an embodiment, and as mentioned above, the terms "WWW" and/or "Web" refer to a part of the Internet that complies with the Hypertext Transfer Protocol. The Internet and/or the Web, therefore, in this context, may comprise an service that organizes stored content, such as, for example, text, images, video, etc., through the use of hypermedia, for example. A HyperText Markup Language ("HTML"), for example, may be utilized to specify content and/or to specify a format for hypermedia type content, such as in the form of a file and/or an "electronic document," such as a Web page, for example. An Extensible Markup Language ("XML") may also be utilized to specify content and/or format of hypermedia type content, such as in the form of a file or an "electronic document," such as a Web page, in an embodiment. Of course, HTML and/or XML are merely example languages provided as illustrations. Furthermore, HTML and/or XML (and/or similar terms) is intended to refer to any version, now known and/or later developed of these languages. Likewise, claimed subject matter is not intended to be limited to examples provided as illustrations, of course.

As used herein, the term "Web site" and/or similar terms refer to a collection of related Web pages. Also as used herein, "Web page" and/or similar terms refer to any electronic file and/or electronic document, such as may be accessible via a network, including by specifying a URL for accessibility via the Web, in an example embodiment. As alluded to above, in one or more embodiments, a Web page may comprise content coded using one or more languages, such as, for example, markup languages, including HTML and/or XML, although claimed subject matter is not limited in scope in this respect. Also, in one or more embodiments, application developers may write code in the form of JavaScript, for example, to provide content to populate one or more templates, such as for an application. The term 'JavaScript' and/or similar terms are intended to refer to any now known and/or later developed version of this programming language. However, JavaScript is merely an example programming language. As was mentioned, claimed subject matter is not intended to be limited to examples and/or illustrations.

As used herein, the terms "entry", "electronic entry", "document", "electronic document", "content", "digital content", "item", and/or similar terms are meant to refer to signals and/or states in a physical format, such as a digital signal and/or digital state format, e.g., that may be perceived by a user if displayed, played and/or otherwise executed by a device, such as a digital device, including, for example, a computing device, but otherwise might not necessarily be perceivable by humans (e.g., in a digital format). Likewise, in this context, content (e.g., digital content) provided to a user in a form so that the user is able to perceive the underlying content itself (e.g., hear audio or see images, as examples) is referred to, with respect to the user, as 'consuming' content, 'consumption' of content, 'consumable' content and/or similar terms. For one or more embodiments, an electronic document may comprise a Web page coded in a markup language, such as, for example, HTML (hypertext markup language). In another embodiment, an electronic document may comprise a portion or a region of a Web page. However, claimed subject matter is not intended to be limited in these respects. Also, for one or more embodiments, an electronic document and/or electronic entry may comprise a number of components. Components in one or more embodiments may comprise text, for example, in the form of physical signals and/or physical states (e.g., capable of being physically displayed). Also, for one or more embodiments, components may comprise a graphical object, such as, for example, an image, such as a digital image, and/or sub-objects, such as attributes thereof, which, again, comprise physical signals and/or physical states (e.g., capable of being physically displayed). In an embodiment, content may comprise, for example, text, images, audio, video, and/or other types of electronic documents and/or portions thereof, for example.

Also as used herein, one or more parameters may be descriptive of a collection of signal samples, such as one or more electronic documents, and exist in the form of physical signals and/or physical states, such as memory states. For example, one or more parameters, such as referring to an electronic document comprising an image, may include parameters, such as time of day at which an image was captured, latitude and longitude of an image capture device, such as a camera, for example, etc. In another example, one or more parameters relevant to content, such as content comprising a technical article, may include one or more authors, for example. Claimed subject matter is intended to embrace meaningful, descriptive parameters in any format, so long as the one or more parameters comprise physical signals and/or states, which may include, as parameter examples, name of the collection of signals and/or states (e.g., file identifier name), technique of creation of an electronic document, purpose of an electronic document, time and date of creation of an electronic document, logical path of an electronic document (or portion thereof), encoding formats and/or standards used for encoding an electronic document, and so forth.

Signal packets and/or frames, also referred to as signal packet transmissions and/or signal frame transmissions, may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. A signal packet and/or frame may, for example, be communicated via a communication channel and/or a communication path, such as comprising a portion of the Internet and/or the Web, from a site via an access node coupled to the Internet. Likewise, a signal packet and/or frame may be forwarded via network nodes to a target site coupled to a local network, for example. A signal packet and/or frame communicated via the Internet and/or the Web, for example, may be routed via a path comprising one or more gateways, servers, etc. that may, for example, route a signal packet and/or frame in accordance with a target and/or destination address and availability of a network path of network nodes to the target and/or destination address. Although the Internet and/or the Web comprises a network of interoperable networks, not all of those interoperable networks are necessarily available and/or accessible to the public.

In particular implementations, a network protocol for communicating between devices may be characterized, at least in part, substantially in accordance with a layered description, such as the so-called Open Systems Interconnection (OSI) seven layer approach and/or description. A network protocol refers to a set of signaling conventions, such as for computing and/or communications transmissions, as may, for example, take place between and/or among devices in a network, typically network devices; for example, devices that substantially comply with the protocol and/or that are substantially compatible with the protocol. In this context, the term "between" and/or similar terms are understood to include "among" if appropriate for the particular usage and vice-versa. Likewise, in this context, the terms "compatible with", "comply with" and/or similar terms are understood to include substantial compliance and/or substantial compatibility.

Typically, a network protocol, such as protocols characterized substantially in accordance with the aforementioned OSI description, has several layers. These layers may be referred to here as a network stack. Various types of transmissions, such as network transmissions, may occur across various layers. A lowest level layer in a network stack, such as the so-called physical layer, may characterize how symbols (e.g., bits and/or bytes) are transmitted as one or more signals (and/or signal samples) over a physical medium (e.g., twisted pair copper wire, coaxial cable, fiber optic cable, wireless air interface, combinations thereof, etc.). Progressing to higher-level layers in a network protocol stack, additional operations may be available by initiating network transmissions that are compatible and/or compliant with a particular network protocol at these higher-level layers. For example, higher-level layers of a network protocol may, for example, affect device permissions, user permissions, etc.

A virtual private network (VPN) may enable a remote device to more securely (e.g., more privately) communicate via a local network. A router may allow network communications in the form of network transmissions (e.g., signal packets and/or frames), for example, to occur from a remote device to a VPN server on a local network. A remote device may be authenticated and a VPN server, for example, may create a special route between a local network and the remote device through an intervening router. However, a route may be generated and/or also regenerated if the remote device is power cycled, for example. Also, a VPN typically may affect a single remote device, for example, in some situations.

A network may be very large, such as comprising thousands of nodes, millions of nodes, billions of nodes, or more, as examples. As mentioned, with networks, such as the Internet and/or the Web, gaining popularity, and with a vast multitude of content, such as pages, other electronic documents, other media content and/or applications (hereinafter 'digital content'), becoming available to users, such as via the World Wide Web (herein 'Web'), it may be desirable to provide more efficient and/or more streamlined approaches to gather, organize and/or display content, such as digital content, that may be desired by and/or useful to a user, for example. Internet-type business entities, such as Yahoo!, for example, may provide a wide range of content, such as digital content, that may be made available to users, such as via the Web. Internet-type business entities, such as Yahoo!, for example, may provide web hosting and/or publishing services, for example.

In an embodiment, one or more content publishing entities, such as, for example, one or more Web content publishing entities, may publish content to one or more user computing devices. A user may, for example, execute a browser application on user computing device to browse to a Web page comprising one or more electronic documents, such as news articles, for example, and/or comprising one or more advertisements, in an embodiment. A Web content publishing entity may transmit content, such as a Web page, to a user computing device at least in part in response to the user browsing to a Web page.

Content publishing entities, such as Web content publishing entities, may sell advertisement space, such as one or more regions of a Web page, to one or more advertisers, for example. In general, an amount of revenue that may generated by selling advertisement space on a Web page, for example, may be based, at least in part, on an amount of times users visit and/or otherwise engage with a Web page. Greater amounts of user engagements with a Web page having an advertisement embedded therein may generally result in greater generated revenue. Similarly, lesser amounts of user engagements may result in reduced generated revenue. Content publishers, therefore, may be interested in increasing user visits to a Web page, for example, in order to generate greater revenue from advertisements displayed with a Web page. In an embodiment, a content publisher may contract with a content hosting network to host a publisher's content in an effort to increase user engagement with content. For example, it may be advantageous for a content publisher to have content hosted by a hosting network in response to a determination that an estimated, calculated, and/or otherwise determined amount of revenue that may be generated through user engagement with specified content may increase as compared with an amount of revenue that may be generated if the content is hosted by the content publisher, in an embodiment.

Also, to encourage more frequent and/or greater overall amounts of user visits and/or other user engagement, it may be advantageous to personalize content presented to a user. In an embodiment, content to be presented to a user may be selected based, at least in part, on types of subject matter determined to be of likely interest to a user. For example, one or more electronic documents and/or advertisements to be presented to a user in one or more regions of a Web page may be selected based at least in part on a user's previous purchasing behavior. Also, for example, a user's browsing behavior may be tracked and/or analyzed to determine, at least in part, one or more electronic documents and/or advertisements to be presented to a user.

In an embodiment, a specified content hosting entity, such as a Web site hosting entity, for example, may encourage more frequent and/or greater overall amounts of user visits and/or other user content engagement at least in part by searching a network, such as the Web, for potentially valuable content that, if hosted by the specified content hosting entity, may result in more frequent and/or greater overall amounts of user content engagement, such as user visits to a Web page, than would otherwise likely happen if the potentially valuable content is not hosted by the specified content hosting entity. Also, in an embodiment, an invitation to have potentially valuable content hosted by a specified content hosting entity may be generated without human interaction and may be delivered to a publisher of potentially valuable content. In an embodiment, an invitation to have potentially valuable content hosted by a specified content hosting entity may include an amount of revenue that may have been generated for a publisher of potentially valuable content, such as through advertisement sales, for example, at least in part in response to having potentially valuable content hosted by a specified content hosting entity in a prior period of time.

In an embodiment, at least in part in response to receiving an invitation to have content hosted by a hosting network, a publisher may review the invitation and make a determination as to whether to accept the invitation. In an embodiment, one or more human individuals at a publishing entity may review an invitation and/or may determine whether to accept the invitation, for example. Further, in an embodiment, obtaining a response to an invitation, and/or hosting potentially valuable content in response to obtaining an affirmative response to an invitation may occur without human intervention. Further, in an embodiment, an example process for identifying potentially valuable content, determining an amount of revenue that would have been generated by a specified content hosting entity hosting potentially valuable content over a previous period of time, generating an invitation to have potentially valuable content hosted by a specified content hosting entity, and/or delivering an invitation to a content publishing entity may occur automatically—that is, without human intervention. Additionally, obtaining a response to an invitation from a content publishing entity and/or hosting potentially valuable content in response to obtaining an affirmative response to an invitation from a content publishing entity may occur without human intervention. Of course, claimed subject matter is not limited in scope in these respects.

FIG. 1 is a schematic diagram illustrating an embodiment 100 comprising an example embodiment 110 of a Web page, an example embodiment 130 of a Web page, and/or an example embodiment 120 of a Web page. In an embodiment, Web pages 110 and 120 may be hosted by a first hosting network. As utilized herein, the term "hosting network" refers to a network, such as described above, for example, at least in part dedicated to hosting content. As utilized herein, the term "hosting" refers to storing signal states representative of content at one or more server computing devices and/or transmitting one or more signals representative of content and/or advertisements to one or more user computing devices at least in part in response to a user selecting content, such as by browsing to a Web page, for example. In contrast, "non-hosted" content refers to content displayed by a publishing entity's website in response to a user selecting a link provided by a hosting network. That is, in an embodiment, a user may select a link in a Web page hosted by a hosting network, and, in response to the selection, the user is directed to a website hosted by a publishing entity.

As mentioned, in an embodiment, Web page 110 and/or Web page 120 may be hosted by a first hosting network. In an embodiment, a hosting network may personalize content to be presented to a user. For example, a user may execute a browsing application on a user computing device to navigate to Web page 110. A hosting network may select one or more electronic documents and/or advertisements to be presented to a user based at least in part on one or more user attributes and/or behaviors, for example, and/or may similarly select one or more links to one or more other Web pages, such as Web page 120 and/or Web page 130, to be presented to a user, for example. Similarly, a hosting network may select an example embodiment 122 of an advertisement to be presented to a user based at least in part on one or more user attributes and/or behaviors. By providing personalized content to one or more users, a hosting network may encourage increased user engagement with one or more hosted Web pages, such as Web page 110, Web page 120, and/or Web page 130, for example. Also, by providing a link from Web page 110 to Web page 120, a hosting network may encourage additional visits by one or more users to Web page 120, for example. Increased numbers of visits from one or more users to Web page 120, for example, may increase revenue generated from one or more advertisements, such as advertisement 122.

For example embodiment 100 depicted in FIG. 1, Web page 130 may be hosted by a second hosting network. In an embodiment, a second hosting network may sell advertisement space, such as one or more regions 132 of Web page 130, to one or more advertisers, for example. Also, in an embodiment, a rate at which a second hosting network may be paid for advertisement space may differ from a rate that may be paid to a first hosting network. For example, in an embodiment, a first hosting network for Web pages 110 and/or 120 may provide improved content personalization services as compared with content personalization services provided by a second hosting network for Web page 130. Additionally, a larger hosting network, such as the first hosting network, may have a well-developed advertising network that may be more effectively leveraged to sell higher-value advertisements. Further, the strength of the brand of a larger hosting network may make it possible for the larger hosting network to derive higher advertising rates, for example. In an embodiment, Web pages hosted by a first hosting network for Web pages 110 and/or 120 may tend to draw larger amounts of visits from one or more users as compared with an amount of visits to Web pages hosted by a second hosting network for Web page 130, for example. Therefore, for the present example, a first hosting network for Web pages 110 and 120 may receive a rate for advertisement space that may exceed a rate that may be received by a second hosting network for Web page 130.

In an embodiment, a hosting network, such as a first hosting network for Web pages 110 and 120, for example, may analyze and/or monitor content hosted by a second hosting network, such as Web page 130, and may determine an amount of revenue that would have been generated if content, such as Web page 130, would have been hosted by the first hosting network over a previous period of time. Also, in an embodiment, the first hosting network may generate, without human intervention, an invitation to a content publisher, such as a publisher of Web page 130, for example, to have content, such as Web page 130, hosted by the first hosting network. In an embodiment, an invitation to a content publisher to have content, such as Web page 130, hosted by a hosting network, such as the first hosting network, may include an amount of revenue that would have been generated in response to having content, such as Web page 130, hosted by the first hosting network over a previous period of time.

In another embodiment, a hosting network, such as a first hosting network for Web pages 110 and 120, for example, may analyze and/or monitor content hosted by a second hosting network, such as Web page 130, and may determine an amount of revenue that would have been generated in response to the first hosting network hosting advertisements that appear in content published by the second hosting network in a prior period of time. For example, first hosting network may determine an amount of revenue that would have been generated over a prior period of time in response to the first hosting network providing advertisements, such as advertisement 132, to appear in content, such as Web page 130, hosted by the second hosting network. Also, in an embodiment, the first hosting network may generate, without human intervention, an invitation to the second hosting network to have one or more advertisements, such as advertisement 132, hosted by the first hosting network, for example.

Figure 2:
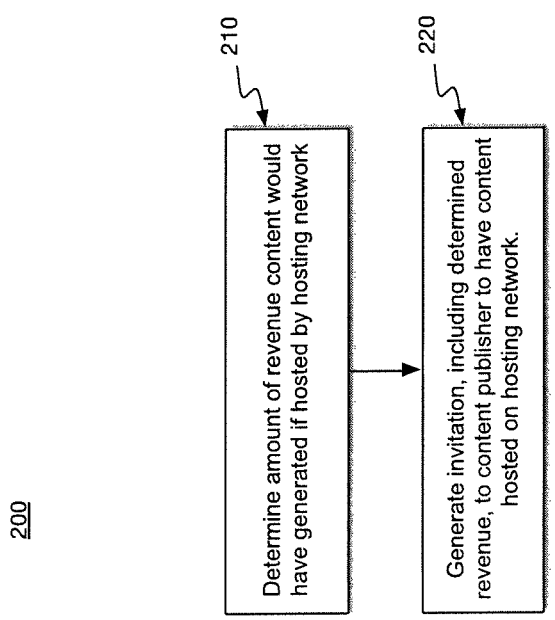
FIG. 2 is a schematic diagram illustrating an example process for generating an invitation to host content in accordance with an embodiment.

FIG. 2 is a flow diagram illustrating an embodiment 200 of an example process for generating an invitation to have content hosted. In an embodiment, an amount of revenue that specified content would generate at least in part in response to being hosted by a specified hosting network may be determined, as depicted at block 210, for example. In an embodiment, determining an amount of revenue that specified content would have been generated if hosted by a hosting network may include monitoring user engagement with the specified content over a period of time. For example, user clicks, dwell times, and/or sharing activity (e.g., Facebook "likes", Twitter "tweets", etc.) may be monitored, and/or an amount of revenue that would have been generated by hosting specified content may be calculated at least in part on monitored user engagement.

In an embodiment, an amount of revenue that would have been generated by hosting specified content on a hosting network may be determined, at least in part, by determining one or more advertisements that would have been displayed, and/or by determining a value for one or more advertisements. Also, in an embodiment, values for the one or more advertisements for individual publishers may be aggregated over a specified period of time, for example.

As depicted at block 220, an invitation to a content publisher to have content hosted by a hosting network may be generated, in an embodiment. For example, an invitation to a content publisher may include an amount of revenue that would have been generated over a prior period of time if specified content would have been hosted by a specified hosting network. In an embodiment, an invitation may be transmitted by a hosting network, without human intervention, to a content publisher. Also, is an embodiment, at least in part in response to obtaining an affirmative response from a content publisher, a hosting network may, without human intervention, host specified content.

In an embodiment, a hosting network may crawl a network, such as the Web, to identify candidate content for potential hosting. In an embodiment, a hosting network may "ghost" host identified content and/or may analyze ghost-hosted content to determine user interest. As used herein, the term "ghost host" and/or "ghost hosting" refers to storing a copy of identified candidate content at a hosting network while identified candidate content continues to be hosted by a previous hosting entity. In an embodiment, a hosting network may track changes to identified content, and/or may reflect changes to identified content in a copy of the content stored at a hosting network. A hosting network may further monitor user engagement with identified candidate content, in an embodiment. For example, a hosting network may monitor user clicks, dwell times, and/or sharing activity for identified candidate content, and may determine user interest in identified candidate content based at least in part on monitored user engagement with identified candidate content. Also, in an embodiment, specified content for a hosting invitation may be selected from identified candidate content based, at least in part, on determined user interest and/or engagement.

In an embodiment, revenue that may be generated for a content publisher as a result of allowing a hosting network to host content may comprise revenue click payments, revenue derived from impressions, advertisement revenue, and/or revenue sharing, for example, although claimed subject matter is not limited in scope in this respect.

Embodiments in accordance with claimed subject matter may include all of blocks 210-220, fewer than blocks 210-220, or more than blocks 210-220. Also, the order of blocks 210-220 is merely an example order, and claimed subject matter is not limited in scope in this respect.

Figure 3:
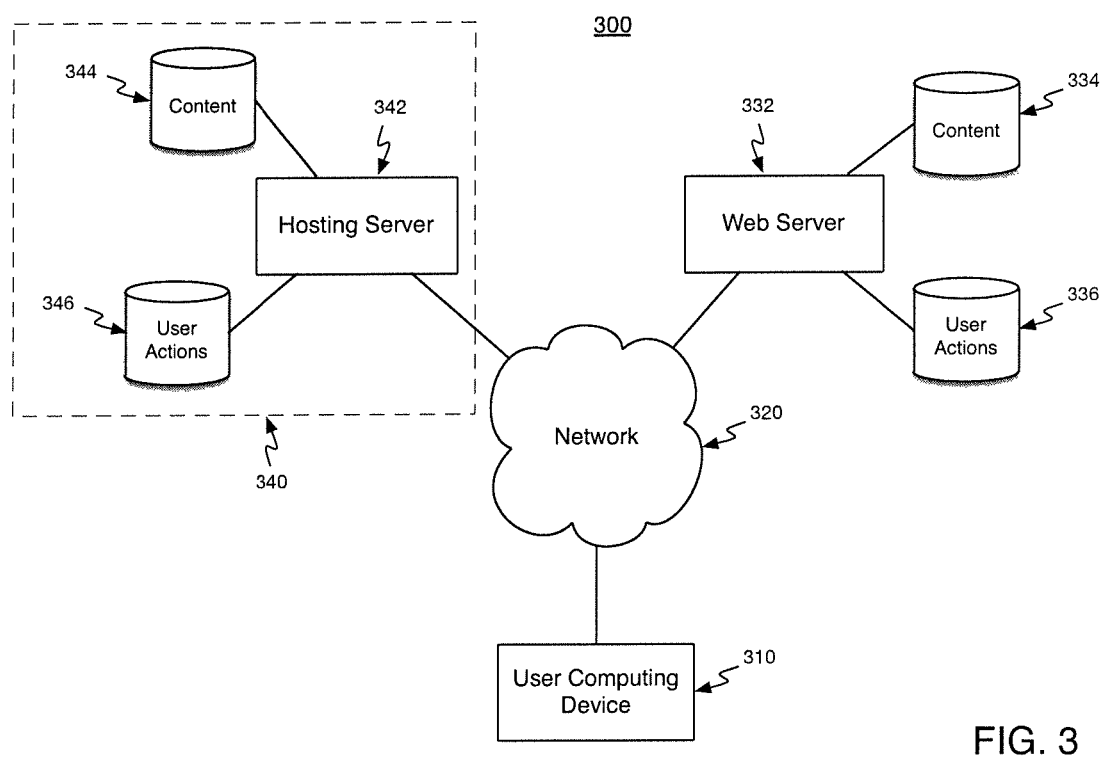
FIG. 3 is a schematic diagram illustrating an example hosting network in accordance with an embodiment.

FIG. 3 is a schematic diagram illustrating an embodiment 300 of an example system comprising an embodiment 340 of a hosting network. In an embodiment, hosting network 340 may comprise a server computing device, such as a hosting server 342, coupled to a network, such as network 320, which may, for example, comprise an Internet and/or Web. Hosting server 342 may host content, such as one or more Web pages, that may be accessed by one or more user computing devices, such as user computing device 310, in an embodiment. For example, hosting server 342 may transmit content, such as a Web page, to a user computing device, such as user computing device 310, at least in part in response to a user navigating to content, such as a Web page, for example by clicking on a link displayed by a browsing application at user computing device 310. In an embodiment, content may be displayed to a user in one or more native device applications. As used herein, a "native device application" refers to a software and/or firmware application stored at a computing device, the software and/or firmware to be executed by a processor of the computing device. In an embodiment, user computing device 310 may comprise one or more of a mobile phone, tablet device, game console, television, and/or reader device, to name but a few examples. Of course, claimed subject matter is not limited in scope in these respects.

As mentioned, revenue may generated by selling advertisement space related to content. For example, Hosting network 340 may sell advertising space on one or more Web pages, in an embodiment. Hosting network 340 may further encourage more frequent and/or greater overall amounts of user visits and/or other user engagement with content hosted by hosting network 340 by personalizing content presented to a user. For example, hosting network 340 may personalize advertisements to be displayed in Web pages hosted by hosting network 340, and/or may also personalize advertisements to be displayed in one or more Web pages hosted by other content publishers, in an embodiment.

In an embodiment, hosting network 340 may search a network, such as network 320, for content that may be candidate for hosting by hosting network 340. For example, hosting network 340 may pull relatively large amounts of content from one or more servers from a network, such as from the Internet. Content pulled from a network, such as from the Internet, may be analyzed to identify content that may be candidate for hosting by hosting network 340. In an embodiment, hosting network 340 may identify candidate content that, if hosted by hosting network 340, may generate more revenue, for example advertisement revenue, than would otherwise be generated if the content is not hosted by hosting network 340. For example, hosting network 340 may search network 320, and may determine that a web server, such as web server 332, may host potentially valuable content, such as one or more web pages, in an embodiment. Hosting network 340 may analyze and/or monitor content, such as content 334, over a period of time to determine an amount of revenue that would have been generated if the content would have been hosted by hosting network 340. For example, hosting network 340 may analyze and/or monitor content hosted by Web server 332 over a period of time to determine whether hosted content may comprise subject matter that may be of interest to a sizeable number of users. Also, in an embodiment, hosting network 340 may analyze and/or monitor user actions 336 associated with content 334 over a period of time at least in part to determine revenue that would have been generated by hosting content 334 at hosting network 340. Example user actions that may be analyzed at least in part to determine and/or estimate potential revenue from advertisement sales may include, but are not limited to, clicks, dwell times, and/or sharing activities.

In an embodiment, a hosting network, such as hosting network 340, may "ghost" advertisement sales for a period of time to determine, at least in part, revenue that would have been generated by having hosting network 340 host content, such as content 334. As used herein, to "ghost" advertisement sales refers to a first hosting network monitoring user engagement with content hosted by a second network over a period of time to determine and/or estimate an amount of revenue that would have been generated at least in part as a result of user engagement with the content had the content been hosted instead by the first hosting network. For example, hosting network 340 may analyze content 334, and may estimate potential user interest in content 334.

At least in part in response to determining an amount of revenue that would have been generated by having hosting network 340 host content 334, for example, hosting network 340 may generate an invitation to have content 334 hosted by hosting network 340, in an embodiment. Also, in an embodiment, an invitation to have content 334 hosted by hosting network 340 may be generated and/or delivered to a publisher of content 334 without human interaction. That is, in an embodiment, an invitation to have specified content, such as content 334, hosted by a specified hosting entity, such as hosting network 340, may be generated automatically. In an embodiment, an invitation to have specified content, such as content 334, hosted by a specified content hosting entity, such as hosting network 340, may include an amount of computed revenue for a content publisher, such as a publisher of content 334, that would have been generated in a prior time period as a result of user engagement with content 334, for example.

At least in part in response to receiving an invitation to have a hosting network host content, a content publisher, such as a publisher of content 334, may determine whether to accept the invitation. A content publisher may be motivated to accept an invitation to have content hosted by a hosting network, such a hosting network 340, if computed revenue for content that would have been hosted at a hosting network, such as hosting network 340, is larger than what the publisher experienced on the views of content that were referred by the hosting network over the same time period. In an embodiment, an invitation may be presented in a form of an email, and/or a response to the invitation from a content publisher may be made by way of an email to a hosting network, for example. Also, in an embodiment, generation of an invitation may occur without human invitation.

Additionally, in an embodiment, a hosting network, such as hosting network 340, may "onboard" content from a content publisher at least in part in response to receiving, from a content publisher, a response to an invitation to have content hosted by a hosting network, such as hosting network 340. As used herein, to "onboard" content refers to a hosting network, such as hosting network 340, obtaining content from a content publisher and/or storing content obtained from a content publisher at one or more server computing devices, such as at content storage 344 of hosting server 342, for example. At least in part as a result of content being onboarded to a hosting network, the hosting network, such as hosting network 340, may commence to host the content. As explained more fully below, a hosting network, such as hosting network 340, may provide content regarding user engagement and/or generated revenue to a content publisher, in an embodiment. Content regarding user engagement and/or generated revenue provided to a content publisher may comprise one or more dashboards, for example. Further, content regarding user engagement and/or generated revenue may be provided to a content publisher in a substantially periodic manner, in an embodiment. Of course, claimed subject matter is not limited is scope in these respects.

Figure 4:
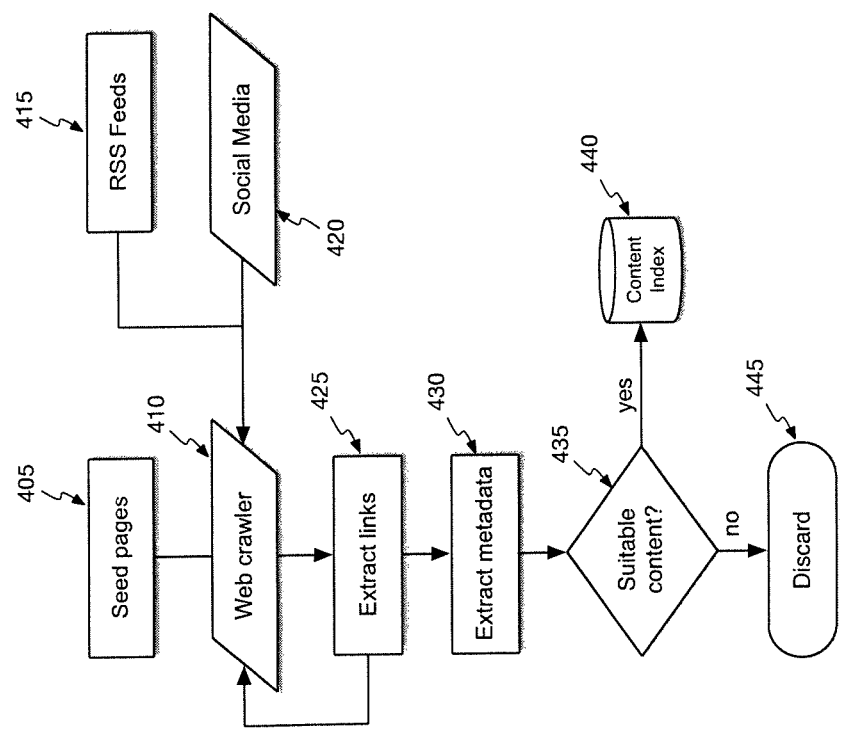
FIG. 4 is a schematic diagram illustrating an example process for selecting content for potential hosting in accordance with an embodiment.

FIG. 4 is a flow diagram illustrating an example embodiment 400 of a process for selecting content for potential hosting. As indicated at block 410, candidate content for hosting may be identified at least in part by crawling a network, such as the Web, in an embodiment. In an embodiment, one or more seed pages 405 may provide input to a Web crawling operation. RSS feeds 415 and/or social media content 420 (e.g., content from Tumblr, Twitter, Facebook, etc.) may also provide input to a Web crawling operation, for example. Further, in an embodiment, one or more links and/or metadata may be extracted from crawled Web pages, as indicated at blocks 425 and 430.

In an embodiment, candidate content may be analyzed, for example, to determine whether candidate content may be suitable for potential hosting, as indicated at block 435. In an embodiment, candidate content may be analyzed, at least in part, to determine and/or estimate user interest. For example, a hosting network may utilize a database of user profile and/or behavior content, perhaps for a very large number of users, at least in part to determine and/or estimate potential user interest in candidate content. In an embodiment, any of a wide range of user attributes and/or behaviors may be included in an estimation of user interest, in an embodiment. Example user attributes and/or behaviors may include geographic location, purchase history, browsing history including clicks and/or dwell times, age, gender, education level, occupation, religious affiliation, political party affiliation, and/or friends list, to name but a few examples. Of course, claimed subject matter is not limited in scope in these respects.

As indicated at block 440, indications of content selected for potential hosting may be stored in a content index database, in an embodiment. For example, content index 440 may store links and/or metadata extracted from crawled Web pages, in an embodiment. Content not determined to be suitable for potential hosting may be discarded, as indicated at block 445, in an embodiment. Further, in an embodiment, identified candidate content may be ghost hosted. For example, relatively large and/or huge amounts of content may be onboarded and/or ghost hosted by a hosting network. Candidate content may be onboarded from a plurality of servers across a network, such as the Web, for example. Also, as mentioned, by onboarding and/or ghost hosting candidate content, a hosting network may monitor user engagement with candidate content. As previously mentioned, "hosting" refers to a hosting network serving content and/or advertisements to a user computing device in response to a user selecting content, such as by browsing to a Web page, for example. As also previously mentioned, "non-hosted" content refers to content displayed by a publishing entity's website in response to a user selecting a link in a Web page hosted by a hosting network, for example.

Embodiments in accordance with claimed subject matter may include all of blocks 405-445, fewer than blocks 405-445, or greater than blocks 405-445. Also, the order of blocks 405-445 is merely an example order, and claimed subject matter is not limited in scope in this respect.

Figure 5:
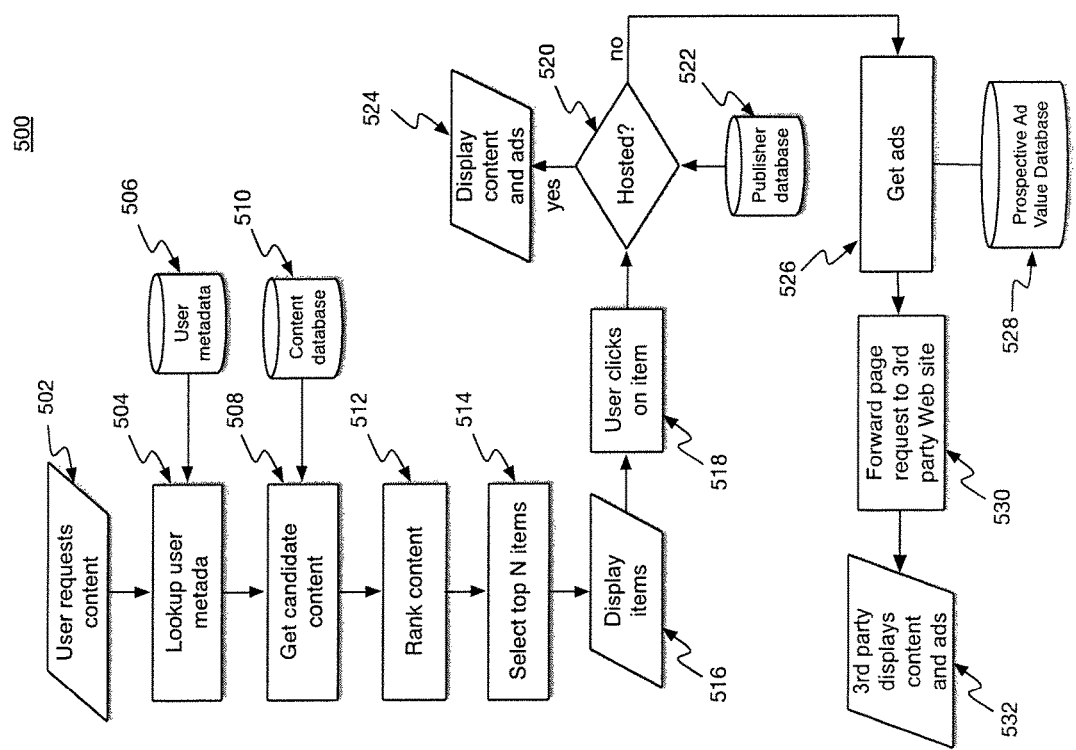
FIG. 5 is a schematic diagram illustrating an example process for hosting content in accordance with an embodiment.

FIG. 5 is a schematic diagram illustrating an embodiment 500 of an example process for hosting content. As indicated at block 502, a user may request content. For example, a user may navigate to a Web page using a Web browsing application executed on a user computing device. At least in part in response to a user requesting content, user metadata may be retrieved from a user database 506, as indicated at block 504. In an embodiment, user metadata may comprise, for example, content related to one or more user attributes and/or user browsing behavior. As indicated at block 508, candidate content for potential display to a user may be retrieved from content database 510. Candidate content may be ranked, for example according to estimated user interest, as indicated at block 512, in an embodiment. Also, in an embodiment, a number of content items may be selected for display to a user, as indicated at block 514, in response to the user request obtained at block 502. In an embodiment, ranked content, such as depicted at block 512, may comprise a personalized list of content that may be generated for one or more users. For example, a content publisher may personalize content, such as one or more Web pages and/or one or more articles, article headlines, and/or article summaries that may be displayed in one or more Web pages, to be displayed to one or more users. For example, a content publisher may publish a Web page devoted to sports. One or more specified users may demonstrate an interest in a particular sport, and/or may demonstrate an interest in a particular team, for example. A content publisher may personalize a Web page for these specified users by including articles related to the particular sport and/or particular team, in an embodiment. As indicated at block 516, personalized content items may be displayed to a user. For example, a content publisher may display a personalized Web page to a user in response to a user request, such as depicted at block 502, in an embodiment.

Also, as indicated at block 518, one or more users may interact with one or more content items. As used herein, "content item" refers to a subset of content. For example, content may comprise a Web page and a content item may comprise an electronic document embedded in the Web page, in an embodiment. Also, in an embodiment, user interaction with a content item may comprise, by way of non-limiting example, one or more clicks, one or more dwell times, and/or one or more sharing activities. Such user interaction with a content item may be referred to as user engagement with a content item, in an embodiment.

As indicated at block 520, a determination may be made as to whether or not a content item selected by a user is hosted by a hosting network, in an embodiment. For example, at least in part in response to a determination that a content item selected by a user is hosted by a hosting network, such as the same hosting network that received the user request for content, the hosting network may display the selected content and/or one or more advertisements, as indicated at block 524. Also, for example, at least in part in response to a determination that a content item selected by a user is not hosted by a hosting network, a page request may be forwarded to a third party Web site, as indicated at block 530. Publisher identification content may be stored in a publisher database, such as indicated at block 522. Also, as indicated at block 526, content, such as one or more advertisements, may be selected for display to a user, in an embodiment. As indicated at block 532, a third party publisher may display the content and the advertisements, in an embodiment. Further, in an embodiment, content indicative of value of one or more advertisements to be displayed to a user may be stored in a database, such as prospective advertisement value database 528. In an embodiment, prospective advertisement value database 528 may contain content indicating revenue that would have been generated for one or more advertisements displayed to one or more users had the content been hosted by the hosting network, thereby allowing the hosting network to display advertisements along with the content. In this manner, revenue that would have been generated by hosting content and/or advertisements previously displayed to a user by a third party publisher may be monitored.

Embodiments in accordance with claimed subject matter may include all of blocks 502-532, fewer than blocks 502-532, or greater than blocks 502-532. Also, the order of blocks 502-532 is merely an example order, and claimed subject matter is not limited in scope in this respect.

Figure 6:
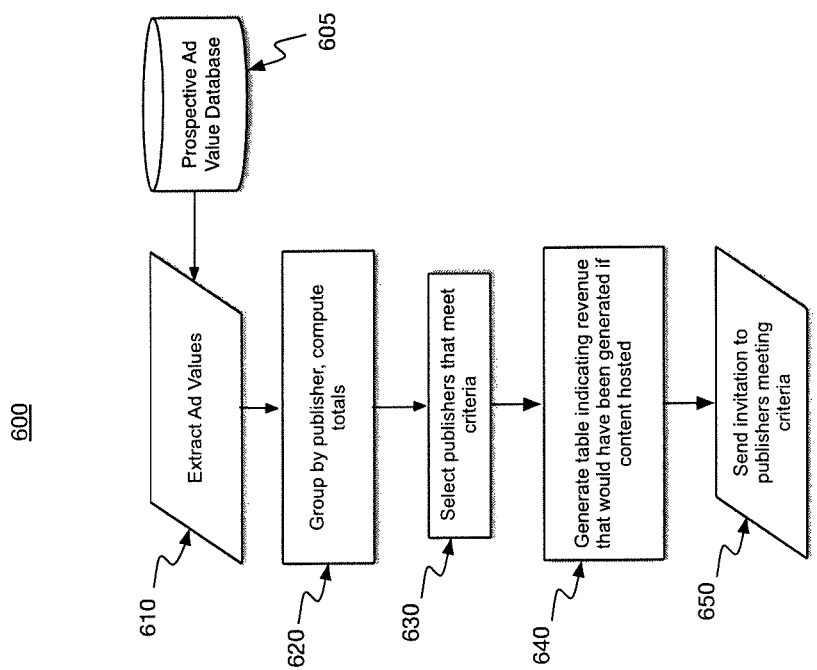
FIG. 6 is a schematic diagram illustrating an example process for generating an invitation to have content hosted in accordance with an embodiment.

FIG. 6 is a schematic diagram illustrating an embodiment 600 of an example process for generating an invitation to have content hosted. As indicated at block 610, saved valuation content regarding one or more advertisements may be extracted from a storage, such as prospective advertisement value database 605. For example, prospective advertisement value database 605 may contain content indicating revenue that would have been generated for one or more advertisements previously displayed to one or more users had the advertisements been hosted by a specified hosting network. In an embodiment, stored advertisement valuation content may comprise one or more signal states stored in a memory of a server computing device, for example.

In an embodiment, content and/or advertisement information selected and/or extracted at block 610, for example, may be grouped according to publishing entity, as indicated at block 620. Also, in an embodiment, revenue that would have been generated by hosting content from individual publishing entities may be computed, as also indicated at block 620. In an embodiment, total revenue that would have been generated by hosting content may be computed. Additionally, as indicated at block 630, for one or more individual publishing entities, a determination may be made as to whether the individual publishing entities meet or exceed one or more specified criteria. For example, a determination may be made as to a number of user views and/or other user engagements that occurred for content published by individual publishing entities over a specified period of time, in an embodiment. In another embodiment, total revenue per individual publisher may be determined, and the total revenue may be compared to a threshold amount of revenue. In an embodiment, one or more publishers having content that would have generated at least a specified threshold amount of revenue if content from the individual publishers had been hosted by a hosting network may be selected.

As indicated at block 640, at least in part in response to a selection of one or more publishers that meet specified criteria, a table may be constructed indicating revenue that would have been generated by having content hosted by a hosting network. In an embodiment, a revenue table may comprise one or more elements of embodiment 1100 of a revenue dashboard, described below. In an embodiment, a revenue table may communicate to a publisher an amount of revenue that would have been generated by having specified content hosted by a hosting network.

Further, in an embodiment, an invitation to have content hosted by a hosting network may be generated and/or may be transmitted to a publisher, as indicated at block 650. In an embodiment, an invitation may comprise an estimated and/or computed amount of revenue that would have been generated in response to having content hosted by a specified hosting network during a prior time period. With an invitation comprising computed prior revenue, a publishing entity may determine whether to accept the invitation to have content hosted by a specified hosting network, in an embodiment.

In an embodiment, whether content may be hosted by a hosting network may depend, at least in part, on whether a content publisher provides an affirmative response to an invitation to have the content hosted. In an embodiment, an invitation to have content hosted by a hosting network may specify the hosting network, and may further comprise an amount of revenue that would have been generated in response to having content hosted by the specified hosting network.

In an embodiment, an invitation to have content hosted by a hosting network may be generated and/or delivered to a content publisher without human intervention. Also, in an embodiment, content may be onboarded and/or hosted by a hosting network without human intervention at least in part in response to obtaining an affirmative response from a content publisher to have content hosted. In another embodiment, an invitation to have content hosted by a hosting network may be personally delivered and/or communicated by a human to a content publishing entity. For example, in a situation where an invitation may comprise a relatively large amount of determined, calculated, and/or estimated revenue, it may be advantageous to have personal interaction with a content publishing entity. Also, for example, in a situation where an invitation may comprise relatively small amount of determined, calculated, and/or estimated revenue, an invitation to have content hosted by a hosting network may be delivered without human intervention to a content publisher. In this manner, by having a capability to deliver an invitation to a content publisher without human intervention, greater numbers of content publishers may be contacted, and/or greater opportunities to host potentially valuable content may be realized, in an embodiment. Of course, claimed subject matter is not limited in scope in these respects.

Embodiments in accordance with claimed subject matter may include all of blocks 605-650, fewer than blocks 605-650, or greater than blocks 605-650. Also, the order of blocks 605-660 is merely an example order, and claimed subject matter is not limited in scope in this respect.

Figure 7:
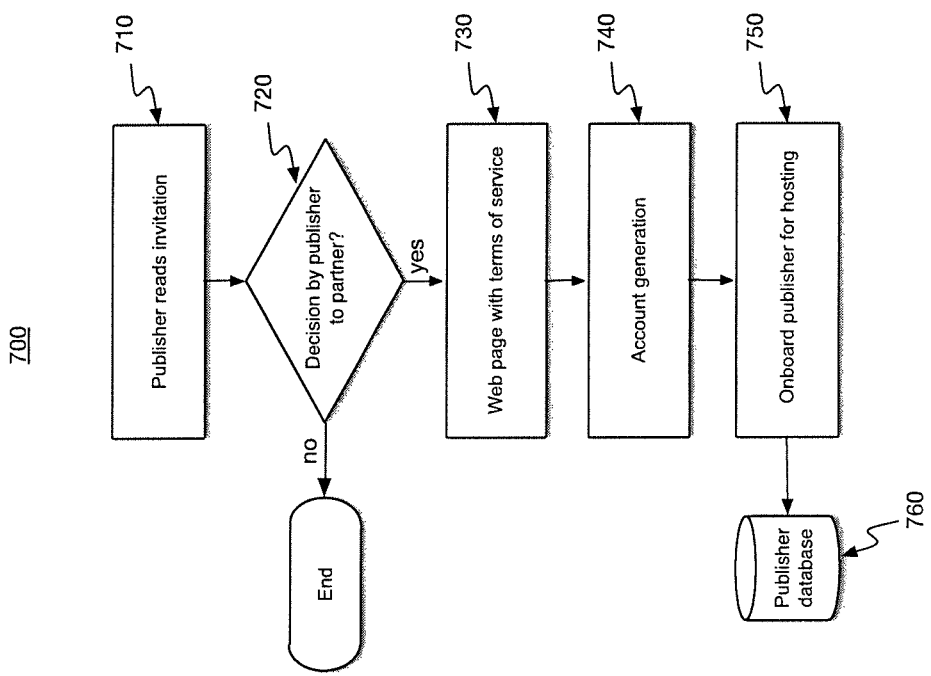
FIG. 7 is a schematic diagram illustrating an example process for obtaining an acceptance of an invitation to host content in accordance with an embodiment.

FIG. 7 is a schematic diagram illustrating an embodiment 700 of an example process for obtaining an acceptance of an invitation to have content hosted, such as by a hosting network. In an embodiment, an invitation delivered to a content publisher may be read by a publisher, as indicated at block 710. For example, a hosting network, such as hosting network 340 depicted in FIG. 3, may transmit one or more signals indicative of an invitation to have content hosted by the hosting network to a content publishing entity, and an individual at the content publishing entity may review the invitation. In an embodiment, an invitation may comprise an amount of revenue that would have been generated by having content hosted by a specified hosting network so that the publishing entity can make a determination as to whether to accept the invitation.

As depicted at block 720, a determination may be made as to whether an acceptance to an invitation to have content hosted by a hosting network has been received from a publishing entity. At least in part in response to receiving an acceptance of an invitation to have content hosted, a hosting network may onboard and/or host content from a publishing entity, as depicted at block 750. In an embodiment, as part of an onboarding and/or hosting operation, a Web page containing terms of service may be communicated to a publishing entity, as indicated at block 730. In an embodiment, a terms of service Web page may enable a publishing entity and hosting network to enter into a contract for hosting services in an efficient manner. Additionally, as indicated at block 740, an account for a publishing entity may be generated. In an embodiment, generation of an account may occur at least in part in response to an acceptance by a publisher of terms of service, such as presented in a Web page as indicated at block 730. In an embodiment, an account may comprise an online portal that may be accessed by a publisher to monitor aspects of content hosting activities, including, for example, aspects related to revenue and/or advertising.

Figure 11:
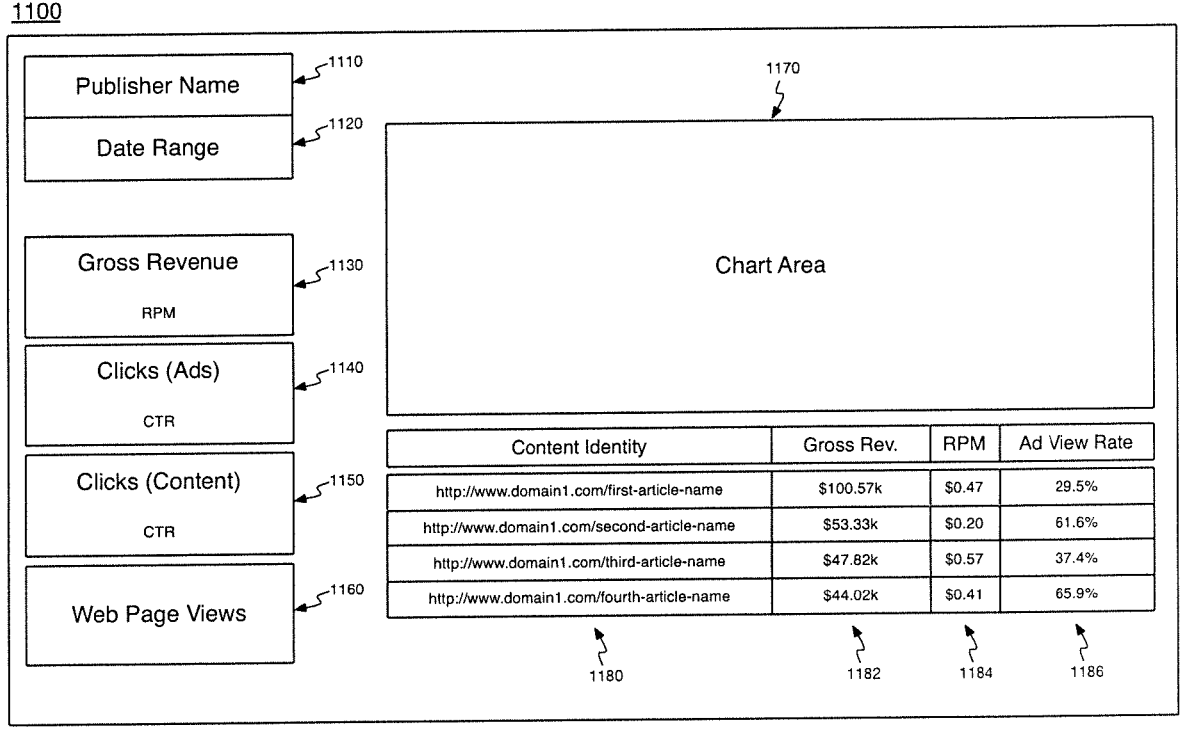
FIG. 11 is a schematic diagram illustrating an example estimated revenue dashboard in accordance with an embodiment.

Further, a hosting network may track revenue generated by hosting content onboarded from a publishing entity, in an embodiment. In an embodiment, revenue content may be stored in a publisher database, such as database 760. Also, in an embodiment, a hosting network may occasionally and/or periodically provide revenue information to a publishing entity. In an embodiment, a hosting network may substantially periodically transmit revenue and/or user engagement information to a publishing entity by way of one or more dashboards, as depicted at FIG. 11, discussed below.

Embodiments in accordance with claimed subject matter may include all of blocks 710-760, fewer than blocks 710-760, or greater than blocks 710-760. Also, the order of blocks 710-760 is merely an example order, and claimed subject matter is not limited in scope in this respect.

Figure 8:
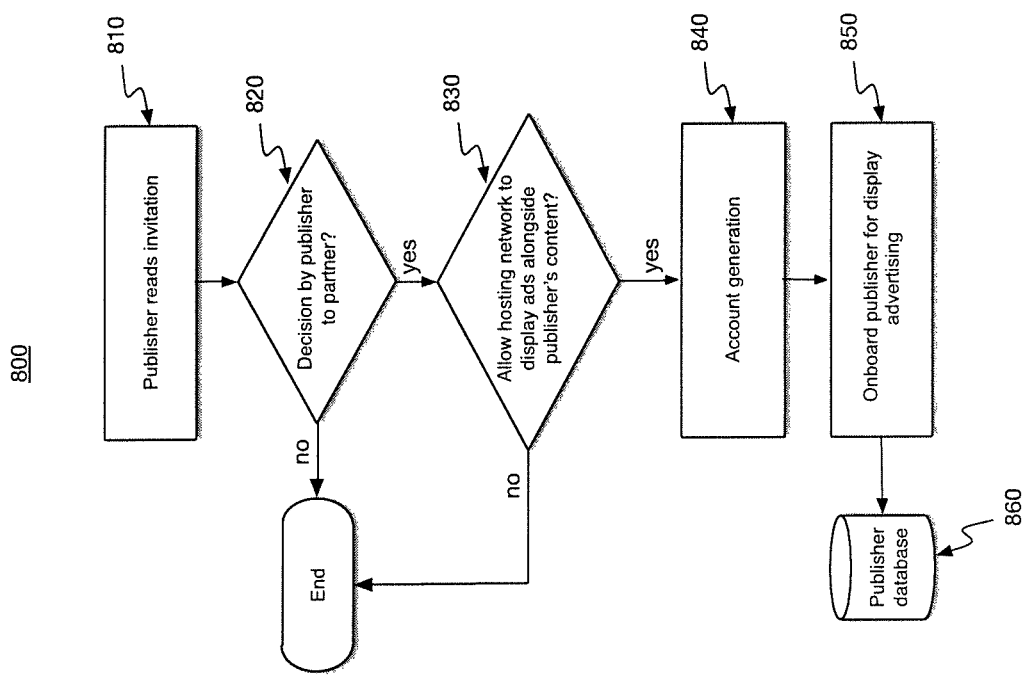
FIG. 8 is a schematic diagram illustrating an example process for obtaining an acceptance of an invitation to display advertisements in accordance with an embodiment.

FIG. 8 is a schematic diagram illustrating an embodiment 800 of an example process for obtaining an acceptance of an invitation to allow a hosting network to display advertisements alongside publisher content. In an embodiment, an invitation delivered to a content publisher may be read by a publisher, as indicated at block 810. For example, a hosting network, such as hosting network 340 depicted in FIG. 3, may transmit one or more signals indicative of an invitation to allow a hosting network to display advertisements alongside content published by a publishing entity, and an individual at the content publishing entity may review the invitation. In an embodiment, an invitation may comprise an amount of revenue that would have been generated by allowing a hosting network to display advertisements alongside content published by the publishing entity, so that the publishing entity can make a determination as to whether to accept the invitation.

As depicted at block 820, a publishing entity may determine whether to enter into a partnership with a hosting entity at least in part in response to receiving an invitation. Also, as depicted at block 830, a publisher may determine whether to allow a hosting network to display advertisements alongside publisher content, in an embodiment. In an embodiment, a publisher may transmit an acceptance of an invitation to the hosting network. Further, at least in part in response to receiving an acceptance of an invitation from a publishing entity to allow a hosting network to display advertisements alongside content published by the publishing entity, the hosting network may generate an account for the publishing entity, as depicted at block 840. As previously mentioned, an account may comprise an online portal that may be accessed by a publisher to monitor aspects of content hosting activities, including, for example, aspects related to revenue and/or advertising, in an embodiment. Also, in an embodiment, at least in part in response to receiving an acceptance of an invitation to allow a hosting network to display advertisements alongside content published by a publishing entity, a hosting network may onboard and/or host content from a publishing entity, as depicted at block 850. Further, a hosting network may track revenue generated by displaying advertisements alongside content published by a publishing entity, in an embodiment. In an embodiment, revenue content may be stored in a publisher database, such as database 860. Also, as previously mentioned, a hosting network may occasionally and/or periodically provide revenue content to a publishing entity, in an embodiment.

Embodiments in accordance with claimed subject matter may include all of blocks 810-860, fewer than blocks 810-860, or greater than blocks 810-860. Also, the order of blocks 810-860 is merely an example order, and claimed subject matter is not limited in scope in this respect.

Figure 9:
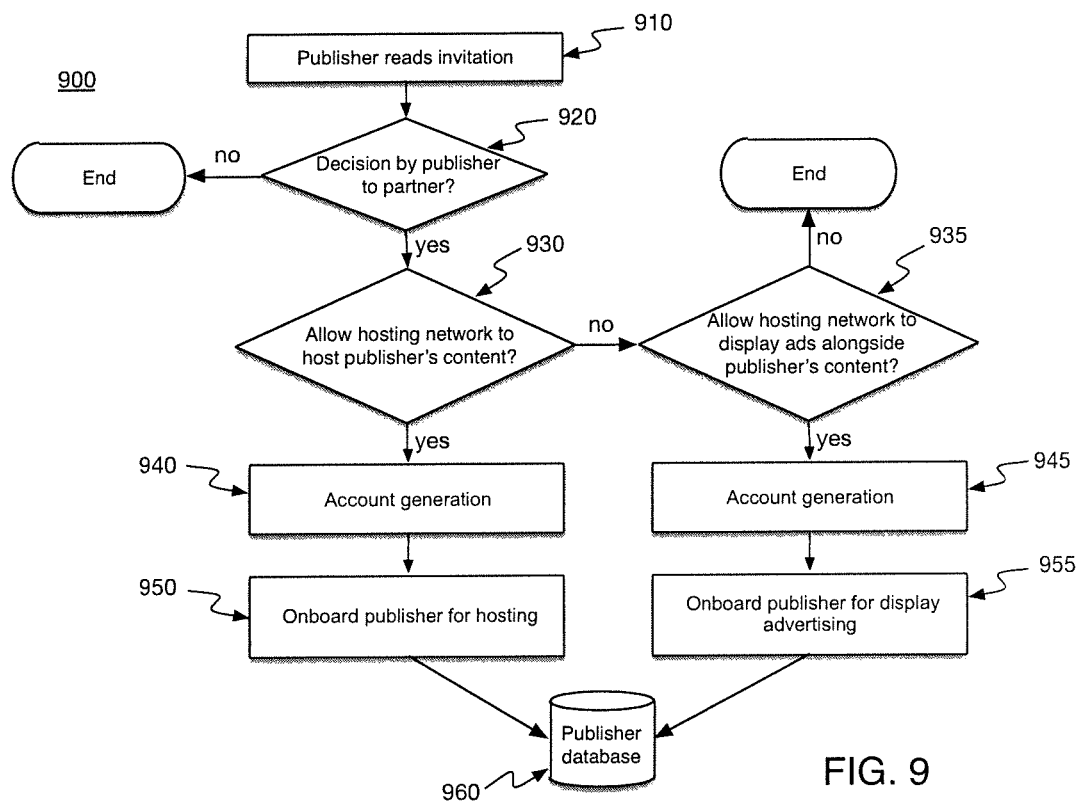
FIG. 9 is a schematic diagram illustrating an example process for obtaining an acceptance of an invitation to host content and/or to display advertisements in accordance with an embodiment.

FIG. 9 is a schematic diagram illustrating an embodiment 900 of an example process for obtaining an acceptance of an invitation to have content hosted by a hosting network and/or to have a hosting network display advertisements alongside publisher content. In an embodiment, an invitation delivered to a content publisher may be read by a publisher, as indicated at block 910. For example, a hosting network may transmit, from the hosting network to a publishing entity, an invitation to have content hosted by the hosting network and/or to allow the hosting network to display advertisements alongside content published by the publishing entity. In an embodiment, an individual at a publishing entity may review the invitation. In an embodiment, an invitation may comprise an amount of revenue that would have been generated by having content hosted by a specified hosting network, and/or may also comprise an amount of revenue that would have been generated by allowing a hosting network to display advertisements alongside content published by the publishing entity. In an embodiment, revenue content included in an invitation may enable one or more individuals at a publishing entity to make a determination as to whether to accept the invitation. For example, one or more individuals at a publishing entity may compare the amount of revenue that would have been generated by having content hosted by a specified hosting network and/or by allowing a hosting network to display advertisements alongside content published by the publishing entity with an amount of revenue actually generated by the publishing entity for the same content and/or advertisements over the same time period. If greater revenue would have been generated by partnering with a hosting network, a publisher may decide to accept an invitation for hosting and/or advertisement services, as described above. Of course, claimed subject matter is not limited in scope in these respects.

As depicted at block 920, a publishing entity may determine whether to enter into a partnership with a hosting entity at least in part in response to receiving an invitation. In an embodiment, a publisher may determine whether to allow a hosting network to host specified content published by the publishing entity, as depicted at block 930. In an embodiment, a publisher may transmit an acceptance of an invitation to the hosting network. At least in part in response to receiving an acceptance of an invitation to have content hosted by the hosting network, the hosting network may generate an account for the publishing entity, as depicted at block 940. Also, a hosting network may onboard and/or host content from a publishing entity, as depicted at block 950.

In an embodiment, a publisher may decide to not have a hosting network host content from the publisher, but may decide to allow the hosting network to display advertisements alongside content published by the publisher. For example, in an embodiment, if a publisher determines to not allow a hosting network to host content published by the publisher at block 930, the publisher may determine whether to allow the hosting network to display advertisements alongside publisher content, as depicted at block 935. Further, at least in part in response to receiving an acceptance of an invitation from a publishing entity to allow a hosting network to display advertisements alongside content published by the publishing entity, the hosting network may generate an account for the publishing entity, as depicted at block 945. Further, at least in part in response to receiving an acceptance of an invitation to allow a hosting network to display advertisements alongside content published by a publishing entity, a hosting network may onboard and/or host content from a publishing entity, as depicted at block 955. As mentioned previously, a hosting network may track revenue generated by displaying advertisements alongside content published by a publishing entity, in an embodiment. Also, in an embodiment, a hosting network may track revenue generated by hosting a publisher's content. In an embodiment, revenue content may be stored in a publisher database, such as database 960, and a hosting network may occasionally and/or periodically provide revenue content to a publishing entity, for example.

Embodiments in accordance with claimed subject matter may include all of blocks 910-960, fewer than blocks 910-960, or greater than blocks 910-960. Also, the order of blocks 910-960 is merely an example order, and claimed subject matter is not limited in scope in this respect.

Figure 10:
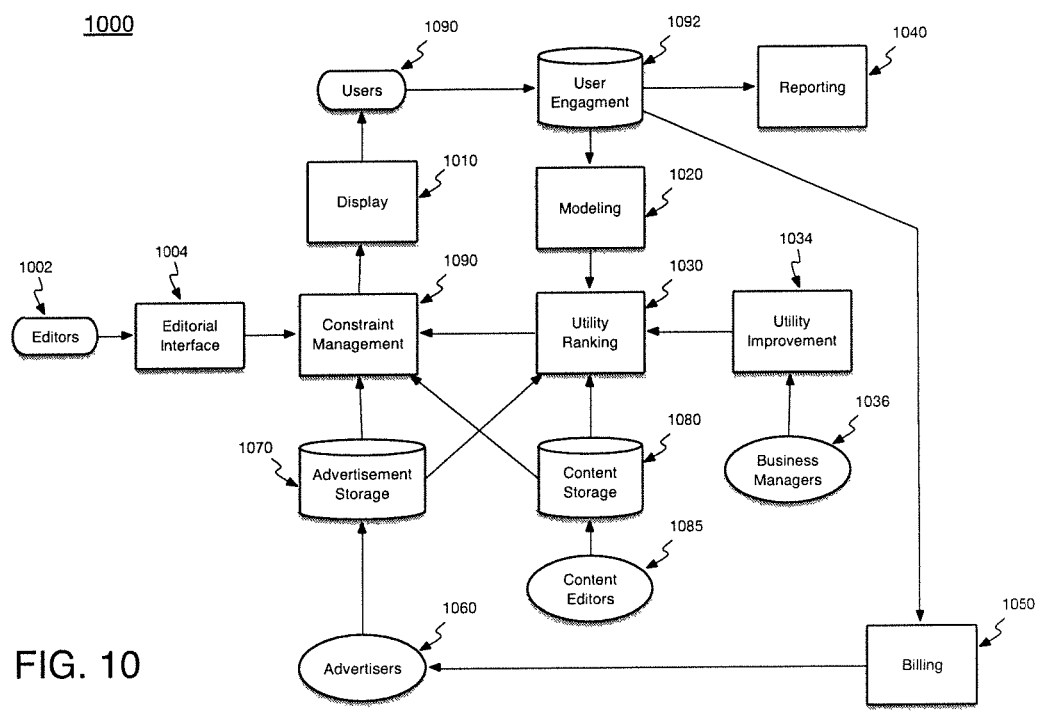
FIG. 10 is a schematic diagram illustrating an example system for content personalization in accordance with an embodiment.

FIG. 10 is a schematic diagram illustrating an embodiment 1000 of an example system for content personalization. Personalization system 1000 may comprise a system to select content to display to a specified user. In an embodiment, a user 1090 may interact with a display unit 1010 which may comprise a graphical user interface of a user computing device, for example. In an embodiment, display unit 1010 may display a Web page, for example, that may comprise one or more electronic documents and/or one or more advertisements. In an embodiment, a user may engage with displayed content, such as one or more Web pages, by clicking on a link, navigating to an individual Web page, dwelling at particular content, playing multimedia content, entering text for search query terms, and/or sharing content, to name but a few non-limiting examples. In an embodiment, user engagement with specified content may monitored and/or recorded in a user engagement database 1092, for example. In an embodiment, records of user engagement with respect to specified content may be converted into logical events that may be indicative of a significance of specified user engagement with specified content. Logical events may be communicated to a modeling unit 1020, in an embodiment. Modeling unit 1020 may generate and/or update models that may be utilized to estimate and/or predict a probability that a specified user will take a specified action in response to the specified user viewing specified content on display unit 1010, for example. Also, in an embodiment, modeling unit may estimate and/or predict downstream user engagement with specified content. As used herein, "downstream event" refers to an even occurring after a user navigates to a new item of content, such as a new Web page, from a previous item of content, such as from a previous Web page. An example downstream event that may be estimated and/or predicted by modeling unit 1020 may include, for example, a number of Web page views by a user after navigating to a new Web page, although claimed subject matter is not limited in scope in this respect.

Embodiment 1000 may also comprise an advertisement storage unit 1070 that may store advertisements developed and/or submitted by advertisers 1060. In an embodiment, advertisements may comprise creative components such as, for example, icons, graphics, textual components, audio, video, animations, and/or other content, although claimed subject matter is not limited in this respect. In an embodiment, advertisements may be presented to a user as part of a Web page, for example. Advertisements may also comprise links to Web pages, in an embodiment. In an embodiment, advertisement storage 1070 may store content related to commercial value of stored advertisements. For example, advertisement storage 1070 may store bid information related to stored advertisements, in an embodiment. In an embodiment, a bid may represent a cost to be paid by an advertiser in response to user engagement with specified content, such as click on an advertisement, for example. Bids may also represent a cost to be paid by an advertiser based at least in part on a user viewing and/or otherwise engaging with an advertisement, for example. However, claimed subject matter is not limited in scope in these respects.

Additionally, embodiment 1000 may comprise a content storage unit 1080 that may store content, such as one or more Web pages and/or articles that may be displayed on a Web page, that may be selected by one or more content editors 1085, for example. Also, in an embodiment, a utility ranking unit 1030 may be provided. For example, utility ranking unit 1030 may utilize content from modeling unit 1020 and may determine a ranked order of content in content storage 1080. In an embodiment, a ranking of articles, Web pages, and/or other content may be based, at least in part, on one or more factors including, for example, a probability that a user may select a particular item of content and/or an estimated revenue that may be generated in response to a user selection of the content.

Further, embodiment 1000 may comprise a utility improvement interface 1034 that may enable one or more business managers 1036 to affect a scoring technique that may be employed by utility ranking unit 1030, for example. In an embodiment, various criteria may be specified by one or more human business managers 1036 to affect content ranking as performed by utility ranking unit 1030. Example criteria for an embodiment may include, but are not limited to, revenue, click-through rate (CTR), dwell time, and/or downstream user engagement. Also, in an embodiment, content ranking may include one or more criteria designed to promote messages that a Web page publisher and/or owner may wish to convey to a user. For example, one or more criteria may be designed to increase a probability of user selection of content related to specified subject matter, in an embodiment. Of course, claimed subject matter is not limited in scope in these respects.

As further depicted in FIG. 10, embodiment 1000 may comprise a constraint management unit 1090 that may enable application of editorial constraints that may affect selection of content from content storage 1080 for display on a Web page by display unit 1010, for example. In an embodiment, an editorial interface 1004 may be provided to allow one or more editors 1002 to determine and/or apply editorial constraints to content selection. For example, one or more human editors 1002 may specify an editorial constraint that may help ensure that a variety of content are presented to a user in one or more Web pages by way of display unit 1010. Of course, this is merely an example type of editorial constraint, and claimed subject matter is not limited in scope in this respect.

Embodiment 1000 may also comprise a reporting unit 1040, for example, that may generate reports based at least in part on user engagements 1092. In an embodiment, reporting unit 1040 may be configured by a user to generate customized reports according to one or more specifications. Also, in an embodiment, reporting unit 1040 may be configured to generate reports on a substantially periodic basis, although claimed subject matter is not limited in scope in this respect. Additionally, embodiment 1000 may comprise a billing unit 1050 that may generate and/or deliver billing information to advertisers 1060. For example, billing unit 1050 may receive input from user engagement database 1092 that may indicate user engagement with advertisers' advertisements. In an embodiment, billing unit 1050 may determine cost to be paid by one or more advertisers 1060 based at least in part on commercial value of specified advertisements obtained from advertisement storage 1070 and/or based at least in part on user engagement with specified advertisements obtained from user engagement database 1092, for example.

In an embodiment, a content personalization system, such as example content personalization system 1000, may be utilized by a hosting network to determine, calculate, and/or estimate revenue that would have been generated over a period of time in response to hosting specified content. For example, billing unit 1050 may calculate advertisement revenue that would have been generated by hosting specified content over a previous period of time, and/or reporting unit 1040 may generate an invitation to have specified content hosted by a specified hosting network that may be provided to a content publisher, in an embodiment. Also, in an embodiment, an invitation may include a revenue amount generated by billing unit 1050, for example.

Although embodiment 1000 depicted in FIG. 10 is described with various functional units arranged in a particular manner, claimed subject matter is not limited in scope in these respects. Other embodiments may include all of the units described in embodiment 1000, more than the units described in embodiment 1000, or fewer than the units described in embodiment 1000. Additionally, the configuration of units described in embodiment 1000 is merely an example configuration, the various interactions described among various units and/or among users are merely example interactions, and claimed subject matter is not limited in scope in these respects.

FIG. 11 is a schematic diagram illustrating an embodiment 1100 of an example revenue dashboard. Dashboard 1100, for example, may be included in an invitation that may be delivered to a content publisher to have specified content hosted by a hosting network, in an embodiment. Also, in an embodiment, dashboard 1100 may comprise an electronic document comprising a plurality of signal states stored in a memory of a computing device, for example. Additionally, dashboard 1100 may be represented as one or more signals that may be transmitted from a hosting network computing device to a content publishing entity computing device, in an embodiment. A dashboard, such as dashboard 1100, may comprise a plurality of fields, such as publisher name field 1110, date range field 1120, and/or other fields, such as those describe below, for example. Of course, claimed subject matter is not limited in scope in these respects.

In an embodiment, dashboard 1100 may further comprise a field 1130 in which to report gross revenue, for example that would have been generated in response to hosting specified content at a specified hosting network. Field 1130 may further comprise an amount representative of revenue per thousand user engagements (RPM), in an embodiment. Also, a field 1140 may comprise an amount of clicks that may be recorded of users selecting advertisements associated with specified content, for example. Additionally, in an embodiment, field 1140 may comprise a click-through-rate (CTR) for advertisements associated with specified content, for example. A field 1150 may comprise an amount of clicks that may be recorded of users selecting specified content, and may further comprise a click-through-rate (CTR) for specified content, in an embodiment. An additional field 1160 may, for an embodiment, comprise an amount of module views. "Module" may refer to a subset of content, for example. Field 1160 may further comprise an amount of Web page views, in an embodiment.

Embodiment 1100 may further comprise a chart area 1170 in which various information may be displayed. For example, in an embodiment, a chart of revenue as it varies over a period of time may be displayed, although claimed subject matter is not limited in scope in this respect. Further, dashboard 1100 may comprise fields 1180 that may identify particular content. For example, fields 1180 may comprise one or more uniform resource locators (URL) that may identify one or more respective electronic documents, such as one or more Web pages and/or one or more articles and/or other content embedded in one or more Web pages, in an embodiment. Also, in an embodiment, fields 1182 may comprise representations of gross revenue for corresponding content identified in fields 1180, for example. Similarly, fields 1184 may comprise representations of revenue per thousand user engagements (RPM) for corresponding content identified in fields 1180, in an embodiment. Further, fields 1186 may comprise advertisement view rates for corresponding content identified in fields 1180, for example. Of course, various fields depicted in FIG. 11 are merely example fields, and embodiments may comprise all fields, fewer fields, and/or more fields than described herein for embodiment 1100.

Figure 12:
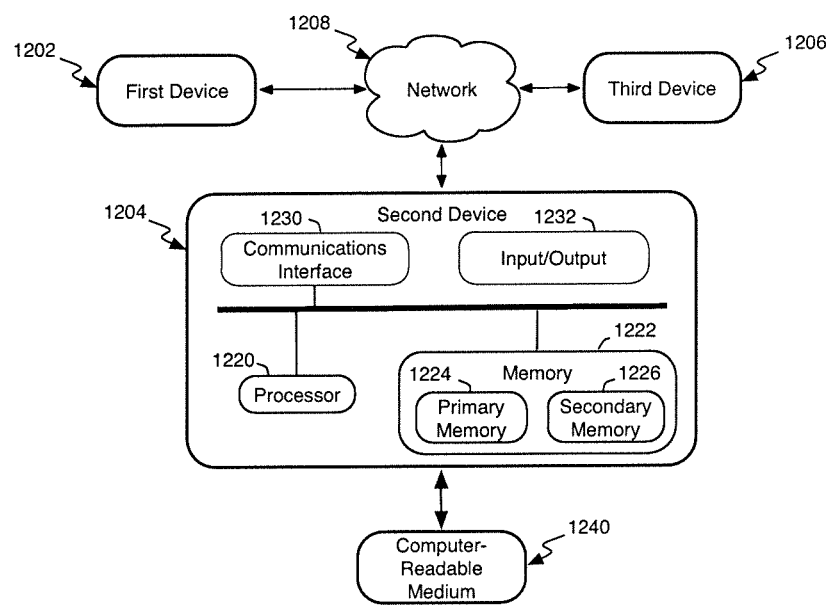
FIG. 12 is a schematic diagram illustrating an example computing device in accordance with an embodiment.

For purposes of illustration, FIG. 12 is an illustration of an embodiment of a system 1200 that may be employed in a client-server and/or server-server type interactions, such as described infra. in connection with hosting content at a hosting network, for example. In FIG. 12, computing device 1202 ('first device' in figure) may interface with computing device 1204 ('second device' in figure), which may comprise features of a server computing device, for example. Communications interface 1230, processor (e.g., processing unit) 1220, and memory 1222, which may comprise primary memory 1224 and secondary memory 1226, may communicate by way of a communication bus, for example. In FIG. 12, computing device 1202 may represent one or more sources of analog, uncompressed digital, lossless compressed digital, and/or lossy compressed digital formats for content of various types, such as video, imaging, text, audio, etc. in the form physical states and/or signals, for example. Computing device 1202 may communicate with computing device 1204 by way of a connection, such as an internet connection, via network 1208, for example. Although computing device 1204 of FIG. 12 shows the above-identified components, claimed subject matter is not limited to computing devices having only these components as other implementations may include alternative arrangements that may comprise additional components or fewer components, such as components that function differently while achieving similar results. Rather, examples are provided merely as illustrations. It is not intended that claimed subject matter to limited in scope to illustrative examples.

Processor 1220 may be representative of one or more circuits, such as digital circuits, to perform at least a portion of a computing procedure and/or process. By way of example, but not limitation, processor 1220 may comprise one or more processors, such as controllers, microprocessors, microcontrollers, application specific integrated circuits, digital signal processors, programmable logic devices, field programmable gate arrays, the like, or any combination thereof. In implementations, processor 1220 may perform signal processing to manipulate signals and/or states, to construct signals and/or states, etc., for example.

Memory 1222 may be representative of any storage mechanism. Memory 1222 may comprise, for example, primary memory 1224 and secondary memory 1226, additional memory circuits, mechanisms, or combinations thereof may be used. Memory 1222 may comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 1222 may be utilized to store a program. Memory 1222 may also comprise a memory controller for accessing computer readable-medium 1240 that may carry and/or make accessible content, which may include code, and/or instructions, for example, executable by processor 1220 and/or some other unit, such as a controller and/or processor, capable of executing instructions, for example.

Under direction of processor 1220, memory, such as memory cells storing physical states, representing, for example, a program, may be executed by processor 1220 and generated signals may be transmitted via the Internet, for example. Processor 1220 may also receive digitally-encoded signals from client computing device 1202.

Network 1208 may comprise one or more network communication links, processes, services, applications and/or resources to support exchanging communication signals between a client computing device, such as 1202, and computing device 1206 ('third device' in figure), which may, for example, comprise one or more servers (not shown). By way of example, but not limitation, network 1208 may comprise wireless and/or wired communication links, telephone and/or telecommunications systems, Wi-Fi networks, Wi-MAX networks, the Internet, a local area network (LAN), a wide area network (WAN), or any combinations thereof.

The term "computing device," as used herein, refers to a system and/or a device, such as a computing apparatus, that includes a capability to process (e.g., perform computations) and/or store content, such as measurements, text, images, video, audio, etc. in the form of signals and/or states. Thus, a computing device, in this context, may comprise hardware, software, firmware, or any combination thereof (other than software per se). Computing device 1204, as depicted in FIG. 12, is merely one example, and claimed subject matter is not limited in scope to this particular example. For one or more embodiments, a computing device may comprise any of a wide range of digital electronic devices, including, but not limited to, personal desktop and/or notebook computers, server computers, high-definition televisions, digital versatile disc (DVD) players and/or recorders, game consoles, satellite television receivers, cellular telephones, wearable devices, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing device.

Memory 1222 may store cookies relating to one or more users and may also comprise a computer-readable medium that may carry and/or make accessible content, including code and/or instructions, for example, executable by processor 1220 and/or some other unit, such as a controller and/or processor, capable of executing instructions, for example. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or the like.

Communications between a computing device and/or a network device and a wireless network may be in accordance with known and/or to be developed communication network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise a detachable smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a Web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages, such as via protocols suitable for transmission of email, short message service (SMS), and/or multimedia message service (MMS), including via a network, such as a social network including, but not limited to, Facebook, LinkedIn, Twitter, Flickr, and/or Google-F, to provide only a few examples. A computing and/or network device may also include and/or execute a software application to communicate content, such as, for example, textual content, multimedia content, and/or the like. A computing and/or network device may also include and/or execute a software application to perform a variety of possible tasks, such as browsing, searching, playing various forms of content, including locally stored and/or streamed video, and/or games such as, but not limited to, fantasy sports leagues. The foregoing is provided merely to illustrate that claimed subject matter is intended to include a wide range of possible features and/or capabilities.

A network may also be extended to another device communicating as part of another network, such as via a virtual private network (VPN). To support a VPN, broadcast domain signal transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any now known and/or to be developed versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets and/or frames, such as in a network of participating digital communications. A broadcast domain may be compliant and/or compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

The invention claimed is:

1. A method, comprising:
    crawling, by one or more servers of a particular hosting network, a specified network to identify candidate content published via the specified network by a publisher and hosted by a hosting entity associated with the publisher;
    monitoring by the one or more servers of the particular hosting network, over a period of time, one or more user engagements with the candidate content;
    storing by the one or more servers of the particular hosting network, in a user engagement database, information representative of the one or more user engagements with the candidate content;
    determining, by the one or more servers of the particular hosting network, whether the information representative of the one or more user engagements with the candidate content meets a desired hosting participation criteria including a threshold amount of user engagements;
    at least in part in response to the information representative of the one or more user engagements with the candidate content meeting the desired hosting participation criteria:
        generating at a first time, by the one or more servers of the particular hosting network, an invitation to the publisher of the candidate content to have the candidate content, which is hosted at the first time by the hosting entity associated with the publisher, hosted by the particular hosting network different than the hosting entity hosting the candidate content, the invitation specifying the particular hosting network; and
        transmitting, by the one or more servers of the particular hosting network, the invitation to a computing device of the publisher of the candidate content;
    receiving, by the one or more servers of the particular hosting network, a response to the invitation to have the candidate content hosted by the particular hosting network from the computing device of the publisher of the candidate content; and
    hosting, by the one or more servers of the particular hosting network, the candidate content on the particular hosting network at least in part in response to determining that the response to the invitation comprises an acceptance of the invitation to have the candidate content hosted by the particular hosting network from the publisher of the candidate content.

2. The method of claim 1, wherein the candidate content comprises one or more web pages.

3. The method of claim 1, comprising:
estimating, by the one or more servers of the particular hosting network, potential user interest in the candidate content based, at least in part, on at least one of one or more user attributes or one or more behavior parameters;
wherein generating and transmitting the invitation by the one or more servers of the particular hosting network are performed based, at least in part, on the potential user interest in the candidate content.

4. The method of claim 1, comprising:
obtaining, by the one or more servers of the particular hosting network, at least one of a link or metadata associated with the candidate content;
storing, by the one or more servers of the particular hosting network, at least one of the link or the metadata associated with the candidate content in a content index database; and
prior to generating and transmitting the invitation, initiating ghost hosting by the one or more servers of the particular hosting network of the candidate content on the particular hosting network;
wherein monitoring, over the period of time, the one or more user engagements with the candidate content includes monitoring user engagement with the candidate content while ghost hosted on the particular hosting network.

5. The method of claim 4, wherein ghost hosting the candidate content on the particular hosting network comprises:
storing a copy of the candidate content in at least one memory of the particular hosting network, wherein the particular hosting network stores the copy of the candidate content while the candidate content continues to be hosted by the hosting entity associated with the publisher; and
serving, by the one or more servers of the particular hosting network, the copy of the candidate content.

6. The method of claim 4, comprising:
estimating, based, at least in part, on the monitoring user engagement with a copy of the candidate content stored in at least one memory of the particular hosting network while the candidate content is ghost hosted on the particular hosting network, an amount of revenue that would have been generated for the publisher if the particular hosting network hosted the candidate content in a second period of time prior to the generating the invitation.

7. The method of claim 6, wherein generating the invitation to the publisher of the candidate content to have the candidate content comprises including in the invitation an indication of the amount of revenue that would have been generated for the publisher if the particular hosting network hosted the candidate content in the second period of time prior to the generating the invitation.

8. The method of claim 1, wherein the candidate content includes two or more content items, the method comprising:
grouping, by the one or more servers of the particular hosting network, the two or more content items according to publishing entity such that the two or more content items are grouped in association with the publisher of the candidate content.

9. The method of claim 1, comprising:
transmitting, by the one or more servers of the particular hosting network, a terms of service web page to the computing device of the publisher of the candidate content in response to determining that the response to the invitation comprises the acceptance of the invitation from the publisher of the candidate content.

10. The method of claim 1, the invitation comprising:
a dashboard comprising a plurality of fields, at least one field of the plurality of fields indicating an amount of user engagement with the candidate content.

11. The method of claim 1, the invitation comprising:
a dashboard comprising a plurality of fields, the plurality of fields comprising a first field of the plurality of fields indicating a first amount of user engagement with first content of the candidate content and a second field of the plurality of fields indicating a second amount of user engagement with second content of the candidate content.

12. The method of claim 1, the invitation transmitted to the computing device of the publisher of the candidate content via an email message.

13. The method of claim 1, the response to the invitation received from the computing device of the publisher of the candidate content via an email message.

14. The method of claim 1, comprising:
estimating, by the one or more servers of the particular hosting network, an amount of revenue that would have been generated for the publisher if the particular hosting network hosted the candidate content in a second period of time prior to the generating the invitation, wherein generating the invitation to the publisher of the candidate content to have the candidate content comprises including in the invitation an indication of the amount of revenue that would have been generated for the publisher if the particular hosting network hosted the candidate content in the second period of time prior to the generating the invitation.

15. The method of claim 14, wherein estimating the amount of revenue that would have been generated for the publisher if the particular hosting network hosted the candidate content in the second period of time prior to the generating the invitation is based, at least in part, on one or more advertisement sales that would have generated revenue for the publisher if the particular hosting network hosted the candidate content in the second period of time prior to the generating the invitation.

16. The method of claim 14, wherein estimating the amount of revenue that would have been generated for the publisher if the particular hosting network hosted the candidate content in the second period of time prior to the generating the invitation is based, at least in part, on one or more advertisement sales that would have generated revenue for the publisher if the particular hosting network provided one or more advertisements to appear in the candidate content in the second period of time prior to the generating the invitation.

17. An apparatus, comprising:
at least one processor of at least one computing device of a particular hosting network, the at least one processor configured to cause:
crawling a specified network to identify candidate content published via the specified network by a publisher and hosted by a hosting entity associated with the publisher;
monitoring, over a period of time, one or more user engagements with the candidate content;

storing, in a user engagement database, information representative of the one or more user engagements with the candidate content;

determining whether the information representative of the one or more user engagements with the candidate content meets a desired hosting participation criteria including a threshold amount of user engagements;

at least in part in response to a determination that the information representative of the one or more user engagements with the candidate content meets the desired hosting participation criteria:

generating, at a first time, an invitation to the publisher of the candidate content to have the candidate content, which is hosted by the hosting entity associated with the publisher, hosted by the particular hosting network different than the hosting entity hosting the candidate content, the invitation specifying the particular hosting network; and transmitting the invitation to a computing device of the publisher of the candidate content;

receiving a response to the invitation to have the candidate content hosted by the particular hosting network from the computing device of the publisher of the candidate content; and initiating hosting the candidate content on the particular hosting network at least in part in response to determining that the response to the invitation comprises an acceptance of the invitation to have the candidate content hosted by the particular hosting network from the publisher of the candidate content.

18. The apparatus of claim 17, the candidate content comprising one or more web pages.

19. The apparatus of claim 17, wherein the one or more user engagements with the candidate content comprise at least one of: a user selection of a particular link, user navigation to a particular web page, user dwelling at the candidate content, or user sharing of the candidate content.

20. The apparatus of claim 17, the candidate content comprising one or more regions of one or more web pages hosted by the publisher of the candidate content.

21. The apparatus of claim 17, the at least one processor configured to cause:

estimating potential user interest in the candidate content based, at least in part, on at least one of one or more user attributes or one or more behavior parameters;

wherein generating and transmitting the invitation are performed based, at least in part, on the potential user interest in the candidate content.

22. A computer readable-medium having stored thereon instructions that when executed by a processor cause performance of operations, the operations comprising:

crawling, by one or more servers of a particular hosting network, a specified network to identify candidate content published via the specified network by a publisher and hosted by a hosting entity associated with the publisher;

monitoring, by the one or more servers of the particular hosting network over a period of time, one or more user engagements with the candidate content;

storing, by the one or more servers of the particular hosting network, information representative of the one or more user engagements with the candidate content;

determining, by the one or more servers of the particular hosting network, whether the information representative of the one or more user engagements with the candidate content meets a desired hosting participation criteria including a threshold amount of user engagements;

at least in part in response to the information representative of the one or more user engagements with the candidate content meeting the desired hosting participation criteria:

generating at a first time, by the one or more servers of the particular hosting network, an invitation to the publisher of the candidate content to have the candidate content, which is hosted at the first time by the hosting entity associated with the publisher, hosted by the particular hosting network different than the hosting entity hosting the candidate content, the invitation specifying the particular hosting network; and transmitting, by the one or more servers of the particular hosting network, the invitation to a computing device of the publisher of the candidate content;

receiving, by the one or more servers of the particular hosting network, a response to the invitation to have the candidate content hosted by the particular hosting network from the computing device of the publisher of the candidate content; and hosting the candidate content on the particular hosting network at least in part in response to determining that the response to the invitation comprises an acceptance of the invitation to have the candidate content hosted by the particular hosting network from the publisher of the candidate content.

23. The computer readable-medium of claim 22, wherein the candidate content comprises one or more web pages.

24. The computer readable-medium of claim 22, wherein the candidate content comprises one or more web pages hosted by the publisher of the candidate content.

25. The computer readable-medium of claim 22, the operations comprising estimating potential user interest in the candidate content based, at least in part, on at least one of one or more user attributes or one or more behavior parameters;

wherein generating and transmitting the invitation are performed based, at least in part, on the potential user interest in the candidate content.

26. The computer readable-medium of claim 22, wherein the one or more user engagements comprise at least one of: user selection of a particular link, user navigation to a particular web page, user dwelling at the candidate content, or user sharing of the candidate content.

27. An apparatus, comprising:

a non-transitory computer-readable storage medium having stored thereon computer-readable instructions executable by at least one computing device of a particular hosting network to:

crawl a specified network to identify candidate content published via the specified network by a publisher and hosted by a hosting entity associated with the publisher;

obtain at least one of a link or metadata associated with the candidate content;

store at least one of the link or the metadata associated with the candidate content in a content index database;

initiate ghost hosting of the candidate content on the particular hosting network;

monitor, over a period of time, one or more user engagements with the candidate content while ghost hosted on the particular hosting network;

store, in a user engagement database, information representative of the one or more user engagements with the candidate content;

determine whether the information representative of the one or more user engagements with the candidate content meets a desired hosting participation criteria including a threshold amount of user engagements;

at least in part in response to a determination that the information representative of the one or more user engagements with the candidate content meets the desired hosting participation criteria:

generate an invitation to the publisher of the candidate content to have the candidate content, which is hosted by the hosting entity associated with the publisher, hosted by the particular hosting network different than the hosting entity hosting the candidate content, the invitation specifying the particular hosting network; and transmit the invitation to a computing device of the publisher of the candidate content; and host the candidate content on the particular hosting network at least in part in response to obtaining an acceptance of the invitation from the publisher of the candidate content.

28. The apparatus of claim 27, wherein ghost hosting the candidate content on the particular hosting network comprises:

storing a copy of the candidate content in at least one memory of the particular hosting network, wherein the particular hosting network stores the copy of the candidate content while the candidate content continues to be hosted by the hosting entity associated with the publisher; and serving, by the particular hosting network, the copy of the candidate content.

29. The apparatus of claim 27, the candidate content comprising one or more web pages.

30. The apparatus of claim 27, wherein the one or more user engagements comprise at least one of: user selection of a particular link, user navigation to a particular web page, user dwelling at the candidate content, or user sharing of the candidate content.

31. The apparatus of claim 27, the candidate content comprising one or more web pages hosted by the publisher of the candidate content.

32. The apparatus of claim 27, the computer-readable instructions executable by the at least one computing device to:

estimate potential user interest in the candidate content based, at least in part, on at least one of one or more user attributes or one or more behavior parameters;

wherein generating and transmitting the invitation is performed based, at least in part, on the potential user interest in the candidate content.

* * * * *